US012713287B2

(12) United States Patent
Zhang et al.

(10) Patent No.: US 12,713,287 B2
(45) Date of Patent: Aug. 18, 2026

(54) NETWORK NODE AND A METHOD THEREIN

(71) Applicant: Telefonaktiebolaget LM Ericsson (publ), Stockholm (SE)

(72) Inventors: Yang Zhang, Sollentuna (SE); Yufeng Zhao, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 371 days.

(21) Appl. No.: 18/684,075

(22) PCT Filed: Aug. 18, 2021

(86) PCT No.: PCT/SE2021/050810
§ 371 (c)(1),
(2) Date: Feb. 15, 2024

(87) PCT Pub. No.: WO2023/022637
PCT Pub. Date: Feb. 23, 2023

(65) Prior Publication Data
US 2025/0142623 A1 May 1, 2025

(51) Int. Cl.
*H04W 28/02* (2009.01)
*H04W 74/0833* (2024.01)
*H04W 74/0838* (2024.01)

(52) U.S. Cl.
CPC ... *H04W 28/0284* (2013.01); *H04W 74/0833* (2013.01); *H04W 74/0838* (2024.01)

(58) Field of Classification Search
CPC ......... H04W 28/0284; H04W 74/0833; H04W 74/0838; H04W 76/27; H04W 76/28; H04L 47/125
See application file for complete search history.

(56) References Cited

U.S. PATENT DOCUMENTS

2013/0242730 A1* 9/2013 Pelletier ............ H04W 74/0833 370/230
2018/0124830 A1 5/2018 Lin et al.
2019/0045555 A1* 2/2019 Martin .............. H04W 28/0205

FOREIGN PATENT DOCUMENTS

CN 112422248 A 2/2021
EP 3349396 A1 7/2018
(Continued)

OTHER PUBLICATIONS

Dynamic Preamble Subset Allocation for RAN Slicing in 5G Networks, Published in: IEEE Access vol. 6, 2018 (Year: 2018).*
(Continued)

*Primary Examiner* — Charles N Appiah
*Assistant Examiner* — Frank E Donado
(74) *Attorney, Agent, or Firm* — Weisberg I.P. Law, P.A.

(57) ABSTRACT

A method for controlling a maximum number of Random Access (RA) preambles for a network node to handle concurrently in a first cell in a wireless communications network. A runtime parameter associated with the network node restricts the network node to handle at most a first maximum number of RA preambles concurrently. The network node monitors load characteristics associated with the first cell. When the load characteristics fulfil a triggering condition, the network node selects a second maximum number of RA preambles to be handled concurrently. The second maximum number is selected such that a probability value fulfils a threshold. The probability value is associated with a probability that RA preambles that are to be concurrently transmitted in the first cell will exceed the second maximum number of RA preambles. The runtime is adjusted to restrict the network node to handle at most the second maximum number of RA preambles concurrently.

20 Claims, 10 Drawing Sheets

(56) References Cited

FOREIGN PATENT DOCUMENTS

| | | | |
|---|---|---|---|
| WO | 2010124228 | A2 | 10/2010 |
| WO | 2015009043 | A1 | 1/2015 |

OTHER PUBLICATIONS

International Search Report and Written Opinion dated Apr. 6, 2022 for International Application No. PCT/SE2021/050810 filed Aug. 18, 2021; consisting of 12 pages.

3GPP TS 38.211 V15.6.0; 3rd Generation Partnership Project; Technical Specification Group Radio Access Network; NR; Physical channels and modulation (Release 15); Jun. 2019; consisting of 97 pages.

3GPP TS 38.141-1 V17.2.0; 3rd Generation Partnership Project; Technical Specification Group Radio Access Network; NR; Base Station (BS) conformance testing Part 1: Conducted conformance testing (Release 17); Jun. 2021; consisting of 318 pages.

3GPP TSG-RAN WG1 Meeting #88 R1-1702127, Title: NR PRACH design, Agenda Item: 8.1.1.4.1, Source: Ericsson, Document for: Discussion, Decision, Date and Location: Feb. 13-17, 2017, Athens, Greece, consisting of 21 pages.

Vural, S., et al., Dynamic Preamble Subset Allocation for RAN Slicing in 5G Networks; Special Section on Recent Advances on Radio Access and Security Methods in 5G Networks; IEEE Access; vol. 6; Jan. 31, 2018; consisting of 18 pages.

* cited by examiner

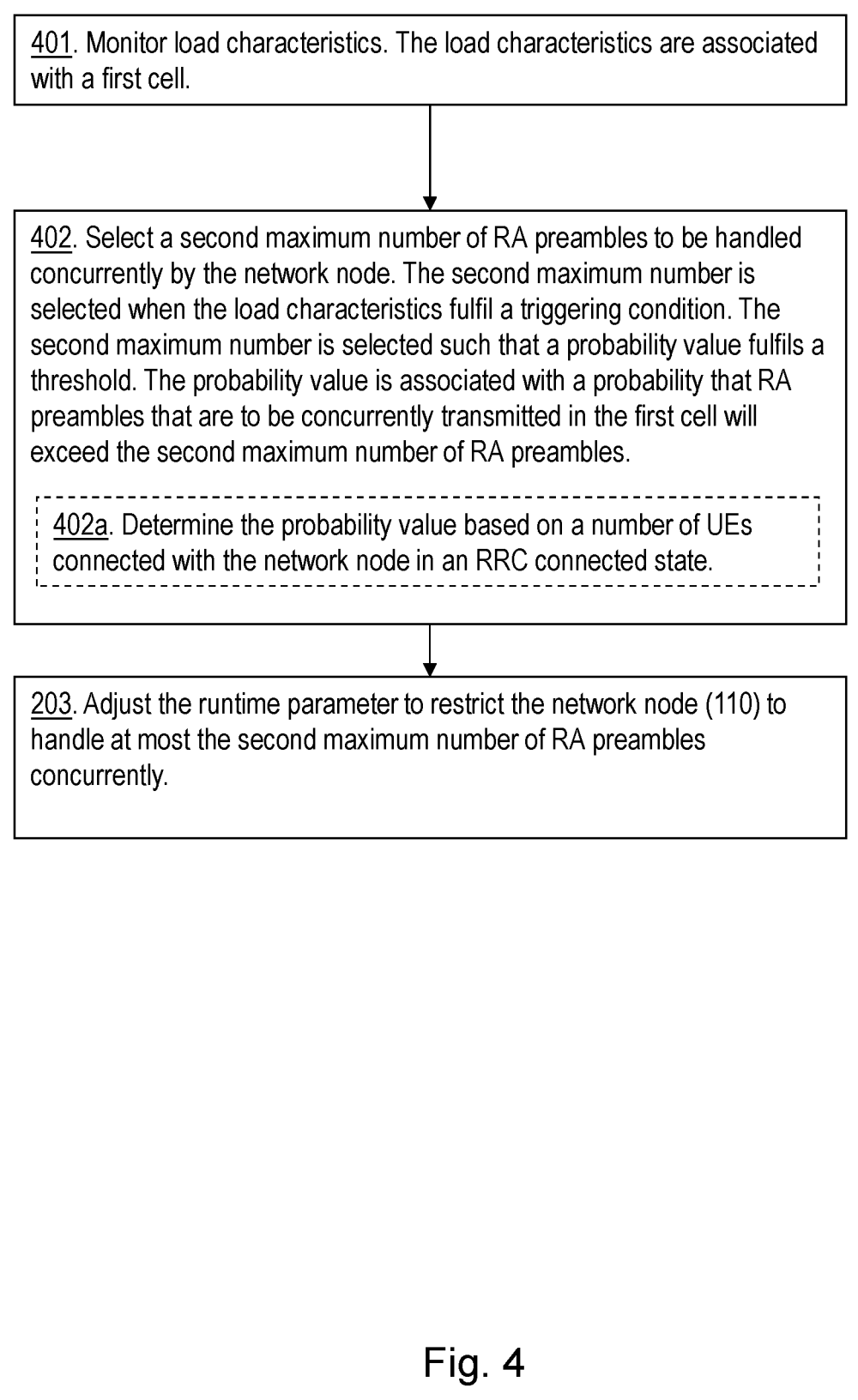

401. Monitor load characteristics. The load characteristics are associated with a first cell.

402. Select a second maximum number of RA preambles to be handled concurrently by the network node. The second maximum number is selected when the load characteristics fulfil a triggering condition. The second maximum number is selected such that a probability value fulfils a threshold. The probability value is associated with a probability that RA preambles that are to be concurrently transmitted in the first cell will exceed the second maximum number of RA preambles.

402a. Determine the probability value based on a number of UEs connected with the network node in an RRC connected state.

203. Adjust the runtime parameter to restrict the network node (110) to handle at most the second maximum number of RA preambles concurrently.

Fig. 4

NETWORK NODE AND A METHOD THEREIN

CROSS-REFERENCE TO RELATED APPLICATIONS

This application is a Submission Under 35 U.S.C. § 371 for U.S. National Stage Patent Application of International Application Number: PCT/SE2021/050810, filed Aug. 18, 2021 entitled "NETWORK NODE AND A METHOD THEREIN," the entirety of which is incorporated herein by reference.

TECHNICAL FIELD

Embodiments herein relate to a network node and a method therein. Furthermore, a computer program and a computer readable storage medium are also provided herein. In particular, embodiments herein relate to controlling a maximum number of Random Access (RA) preambles for the network node to handle concurrently in a first cell in a wireless communications network.

BACKGROUND

In a typical wireless communications network, wireless devices, also known as wireless communication devices, mobile stations, mobile terminals, mobile equipment, stations (STA) and/or User Equipments (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as areas covered by a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with a wireless device within range of the radio network node.

3GPP is the standardization body for specifying the standards for the cellular system evolution, e.g., including 3G, 4G, 5G and the future evolutions, e.g. 6G. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Frequency bands used for 5G NR are being mainly in two different frequency ranges, Frequency Range 1 (FR1) and Frequency Range 2 (FR2), with more frequency ranges being investigated for higher carrier frequency bands, e.g., such as interval ranges 52.6-71 GHz and 71-114.25 GHz. FR1 comprises sub-6 GHz frequency bands. Some of these bands are bands traditionally used by legacy standards but have been extended to cover potential new spectrum offerings from 410 MHz to 7125 MHz. FR2 comprises frequency bands from 24.25 GHz to 52.6 GHz. Bands in this millimeter wave range have shorter range but higher available bandwidth than bands in the FR1.

Multi-antenna techniques may significantly increase the data rates and reliability of a wireless communication system. For a wireless connection between a single user, such as UE, and a base station, the performance is in particular improved if both the transmitter and the receiver are equipped with multiple antennas, which results in a Multiple-Input Multiple-Output (MIMO) communication channel. This may be referred to as Single-User (SU)-MIMO. In the scenario where MIMO techniques is used for the wireless connection between multiple users and the base station, MIMO enables the users to communicate with the base station simultaneously using the same time-frequency resources by spatially separating the users, which increases further the cell capacity. This may be referred to as Multi-User (MU)-MIMO. Note that MU-MIMO may bring benefit to system performance when each UE only has one antenna. Such systems and/or related techniques are commonly referred to as MIMO.

Random Access processing. RA processing in NR may e.g. comprise the following steps for Uplink (UL) processing of RA, e.g. performed in a gNB:

Detection or preambles, performed by a Physical Random Access Channel (PRACH) detector in a physical layer (PHY) for detecting one or more preambles. The preambles in RA may be referred to as preambles, RA preambles, and/or PRACH preambles.

Among the detected RA preambles, one or more of them may be selected for further processing and to prepare an RA response by the gNB. The selection is performed according to the following:

a. A respective signal amplitude and/or signal power. Normally RA preambles with higher signal amplitude and/or signal power are more reliable, and therefore they are more prioritized for further processing.

b. Up to a configurable number of RA preambles may typically be selected in one PRACH occasion, i.e. an Ns value is selected up to an Nmax maximum number of preambles. The maximum configurable number, i.e. Nmax, is typically vendor or product specific. Then a gNB will arrange and/or schedule the same number of Random Access Responses (RAR) accordingly. The Ns value is typically decided based on the gNB's capability of handle the processing required to handle the RA preambles. The Ns value may be a runtime parameter for controlling the maximum number of RA preambles the gNB can handle concurrently.

PRACH detector. PRACH preambles in NR are generated from Zadoff-Chu (ZC) sequences, as described in 3GPP TS 38.211 v15.6.0, "Physical channels and modulation". A preamble consists of one or more periods of the Zadoff-Chu sequence plus a cyclic prefix. A typical PRACH detector is described in 3GPP Tdoc R1-1702127, Ericsson, "NR PRACH design", February 2017. A typical PRACH detector has a bandpass filter followed by a bank of correlators for the configured preamble sequences in a cell. The correlators do correlation computations between input signal and known/expected preamble signals. If preamble contains more than one period, the periodic preamble may be combined either coherently or non-coherently. In the former case the complex correlator output from the different periods is summed. In the latter case the power, the amplitude squared of the correlator output is summed. Furthermore, the correlator outputs from different receive antennas are added non-coherently.

Once a combined signal is formed from the correlator outputs, a preamble is detected if the power scaled by the estimated noise power for any sample within the possible range of delays in the combined signal exceeds a threshold.

The sample with the highest power also gives the estimated time-of-arrival that ideally equals the round-trip time.

The Zadoff-Chu sequences have ideal periodic autocorrelation properties that make it possible to estimate the time-of-arrival with high accuracy as long as the delay of the signal is within the period of the preamble. To increase the number of available sequences, while keeping a certain level of orthogonality between different preambles derived from each base root sequences, a cyclic shift may be applied over the base root sequence. The values of the cyclic shifts of the root sequences, i.e., base sequences, may be represented by a ZeroCorrelationZoneConfig (Ncs) parameter. The Ncs value determines the maximum delay that base station can detect and therefore also impacts cell range.

SUMMARY

As a part of developing embodiments herein a problem was first identified and will be discussed herein.

A typical network node is configured with an upper limit of how many RA preambles the network node can handle concurrently in a cell. Since the cell may be of high or low activity at different time periods, it is difficult to configure the upper limit to match all possible cell activities. If the upper limit is set low, then e.g. when the cell has high activity, the network node will only be able to handle a small proportion of incoming RA preambles, and thus, this will result in an increased number of RA failures for UEs in the cell. In other words, there may be a risk of not being able to handle a sufficient amount of concurrently connecting UEs. If the upper limit is set high, then this increases chances of false detections of incoming RA preambles, and hence, this will result in failing RA procedures. A false detection may e.g. be when receiver detects a preamble that does not exist or is different from the preamble sent by UE. Noise, interference, distortion, fading and doppler shift can also cause false detection. Hence, it is difficult to set an upper limit which best accommodates the current cell activity.

An object of embodiments herein is to improve the efficiency of RA procedures in a wireless communications network.

According to an aspect of embodiments herein, the object is achieved by a method performed by a network node for controlling a maximum number of RA preambles for the network node to handle concurrently in a first cell in a wireless communications network. A runtime parameter associated with the network node restricts the network node to handle at most a first maximum number of RA preambles concurrently. The network node monitors load characteristics. The load characteristics are associated with the first cell. When the load characteristics fulfil a triggering condition, the network node selects a second maximum number of RA preambles to be handled concurrently by the network node. The second maximum number is selected such that a probability value fulfils a threshold. The probability value is associated with a probability that RA preambles that are to be concurrently transmitted in the first cell will exceed the second maximum number of RA preambles. The network node adjusts the runtime parameter to restrict the network node to handle at most the second maximum number of RA preambles concurrently.

According to another aspect of embodiments herein, the object is achieved by a network node configured to control a maximum number of RA preambles for the network node to handle concurrently in a first cell in a wireless communications network. A runtime parameter associated with the network node is adapted to restrict the network node to handle at most a first maximum number of RA preambles concurrently. The network node is further configured to:

monitor load characteristics, wherein the load characteristics are adapted to be associated with the first cell, when the load characteristics fulfil a triggering condition, select a second maximum number of RA preambles to be handled concurrently by the network node, which second maximum number is arranged to be selected such that a probability value fulfils a threshold, wherein the probability value is adapted to be associated with a probability that RA preambles that are to be concurrently transmitted in the first cell will exceed the second maximum number of RA preambles, and adjust the runtime parameter to restrict the network node to handle at most the second maximum number of RA preambles concurrently.

Since the load characteristics of the first cell are monitored, the network node is capable of knowing when it is suitable to adjust the runtime parameter, i.e. when to restrict the network node to the second maximum number of RA preambles to be handled concurrently. Since the runtime parameter is then adjusted to handle at most the second maximum number of RA preambles concurrently, the network node is enabled to dynamically adjust how many RA preambles the network node is restricted to handle concurrently. Furthermore, as the probability value is associated with the probability that RA preambles that are to be concurrently transmitted in the first cell will exceed the second maximum number of RA preambles, the network node is enabled to adjust the runtime parameter such that the probability of exceeding the second maximum number is very unlikely. In other words, the network node is enabled to select the second maximum number such that the network node will support a very probable number of RA preambles in the first cell. Since an improbable high number of RA preambles is not supported by the network node, the network node further avoids overprovisioning the support for a high amount of RA preambles, and in this way false preamble detections are avoided.

BRIEF DESCRIPTION OF THE DRAWINGS

Examples of embodiments herein are described in more detail with reference to attached drawings in which:

FIG. 4 is a flowchart depicting an embodiment of a method in network node.

DETAILED DESCRIPTION

Before discussing the embodiments herein, a more detailed analysis of the identified problem will first be discussed.

The performance of RA may be described by a combination of a capacity of how many RA that can be handled concurrently, and the RA success rate. The RA success rate may e.g. be how often a Message 2 (Msg2) triggers a successfully received Message 3 (Msg3).

Problems regarding the RA success and RA capacity rate are discussed in below problems A-C for a network node handing RA.

Problem A: In case of a low UE activity, e.g. during NR rollout or other non-busy hour, there will be few RA attempts in the network node. A proportion of the RA preamble detections may however be false detections since, according to a 3GPP requirement, e.g. in chapter 8.4 of 3GPP TS 38.141-1 version 17.2.0, a false detection is probability is allowed to be up to 0.1%. While this may appear to be a low probability, this may correspond to one false detection per 10 sec, which may affect the success rate to be poor.

Problem B: Besides the 3GPP-allowed false detections as mentioned in above Problem A, below imperfections may lead to multiple detections of one preamble, e.g. due to a property of ZC sequence:

a) UL frequency error, e.g. due to a bad Downlink (DL) frequency sync at UE, where the error is proportional to carrier frequency, b) Doppler effect, e.g. for a high speed UE or for a high carrier frequency, c) a sudden fading or amplitude change during preamble period, which can change the sequence correlation property.

In these cases, correlation side peaks may emerge together with a main peak from a noise floor so two, or even more preambles, may be detected from one PRACH preamble transmission. Different from Problem A, these false detections' amplitudes may be high above a threshold for preamble detection. Using a restricted set of RA preambles may resolve such false detections. This may however come at a cost of sequence resources and cell planning complexity. The restricted set is normally bundled with a highspeed cell, and is not expected to be generally deployed. It may also be possible to set the network node Ns value to be Ns=1. In other words, to only consider the strongest preamble detection as valid. This may be a simple solution to mitigate Problems A and B since false detections are normally weaker than the true ones.

RA attempts should be responded as quickly and to as many as possible for highest performance. Therefore, an RA capacity should preferably not limit the overall capacity of access network.

Figure 1:
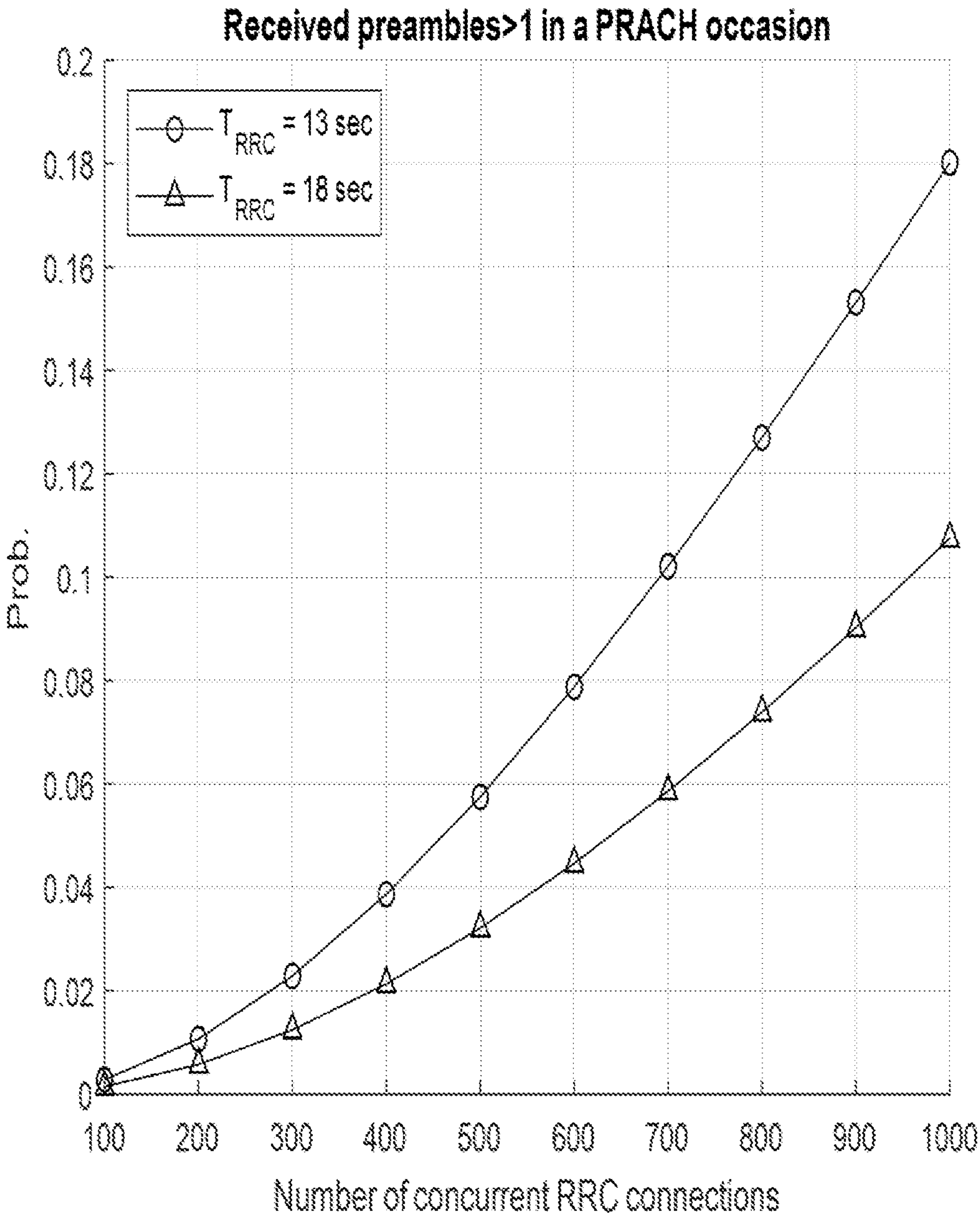
FIG. 1 is a schematic block diagram illustrating prior art.
Figure 2:
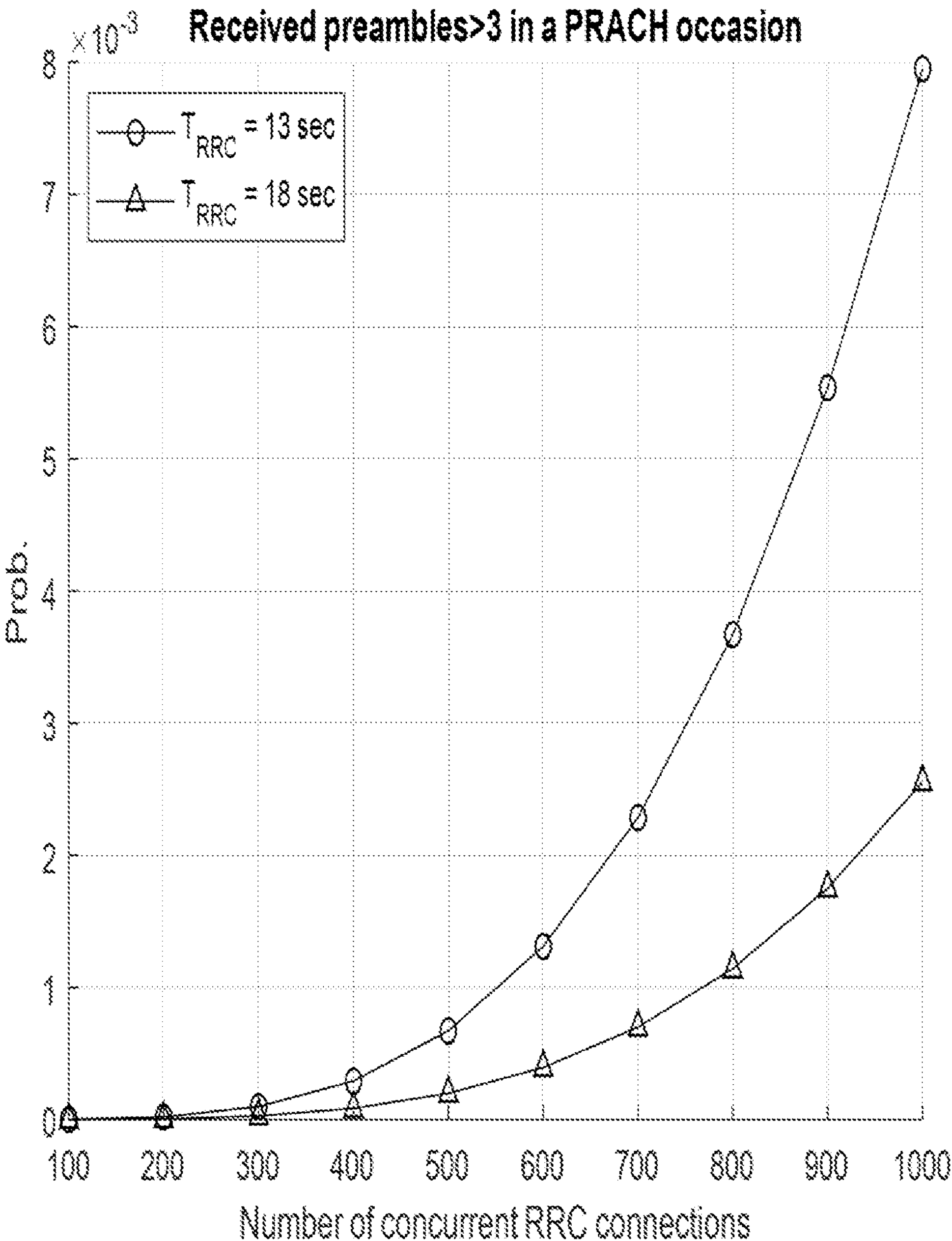
FIG. 2 is a schematic block diagram illustrating prior art.

Problem C: Simultaneous preamble transmissions, i.e. during one PRACH occasion, may occur at high probability if the number of connected UEs (CU) per cell become high. This is illustrated in FIGS. 1 and 2. FIG. 1 illustrates the probability of receiving more than 1 RA preamble in a PRACH occasion. FIG. 2 illustrates the probability of receiving more than 3 RA preamble in a PRACH occasion. In both FIGS. 1 and 2, the line marked with a circle shows a probability of a number of concurrent Radio Resource Control (RRC) connections when the $T_{RRC}$ is 13 seconds. The $T_{RRC}$ is an average RRC connection time, i.e. how long until a UE will reconnect to a cell after the connection has expired. The line marked with a triangle shows a probability of a number of concurrent RRC connections when the $T_{RRC}$ is 18 seconds. As illustrated by FIG. 1 when the network node can only handle one concurrent RA preamble, i.e. setting Ns=1, this will be a bottleneck since with a growing number of concurrent RRC connections, it will be very likely that more than one UE will become inactive and need to re-connect concurrently. As illustrated by FIG. 2 when the network node can handle three concurrent RA preambles, i.e. setting Ns=3, may be less of a bottleneck. As the probability of receiving more than three preambles in the same PRACH occasion is low. Hence, at peak hours, a large Ns value may be necessary to avoid RA congestion. In these scenarios the success rate may be less impacted by false detections than by congestions since true detections will dominate. Therefore, a high number of preambles to be handled concurrently may be needed for best performance.

It can be seen that solutions to the problems A, B regarding RA success rate, and the problem C, are contradictory as the solutions are to either set the number of preambles to be handled concurrently to be very high or to be very low.

To overcome these problems, embodiments herein provide a way to select the maximum number of RA preambles for the network node to handle concurrently based on restricting a probability of that the number of RA preambles received by the network node exceeds the selected maximum number. In this way, the embodiments herein achieve a high RA success rate while still being able to handle most of the concurrent incoming RA preambles.

Figure 3:
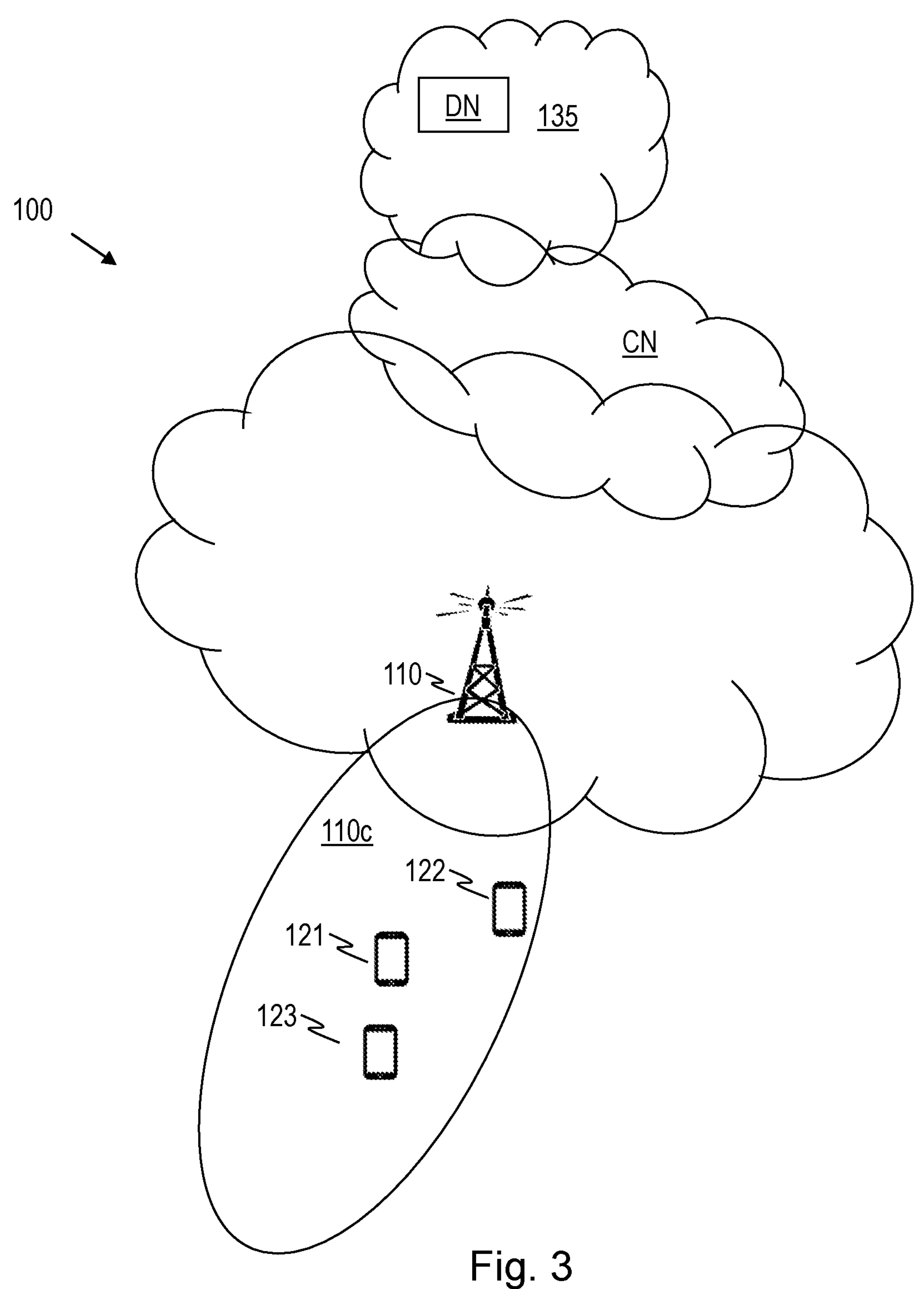
FIG. 3 is a schematic block diagram illustrating embodiments of a wireless communications network.

FIG. 3 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMAX), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g. a network node 110. The network node 110 may be a serving network node which provides radio coverage in a first cell 110*c* to any one or more out of a first UE 121, a second UE 122, and a third UE 123. The network node 110 may be any of a NG-RAN node, a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating over radio, e.g. with any one or more out of the first UE 121, the second UE 122, and/or the third UE 123.

In the wireless communications network 100, one or more UEs operate, such as e.g. the first UE 121, the second UE 122 and the third UE 123. The first UE 121, the second UE 122, and/or the third UE 123 may each respectively be referred to as a wireless device, an internet of things (IoT) device, a mobile station, a non-access point (non-AP) STA, a STA, and/or a wireless terminals. The first UE 121, the second UE 122 and/or the third UE 123 may communicate via one or more Access Networks (AN), e.g. RAN to one or more Core Networks (CN). It should be understood by the skilled in the art that term "UE", is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The first UE 121, the second UE 122 and/or the third UE 123 may be UEs which are to perform RA towards the network node 110.

Methods herein may be performed by the network node 110. As an alternative, a Distributed Node (DN) and functionality, e.g. comprised in a cloud 135 as shown in FIG. 3, may be used for performing or partly performing the methods herein.

Examples of embodiments herein relate to dynamically controlling a maximum number of RA preambles for the network node 110 to handle concurrently in the first cell 110*c*. This is performed by the use of a runtime parameter associated with the network node 110 which may initially be set to restrict the network node 110 to handle at most a first maximum number of RA preambles concurrently. The runtime parameter may be the Ns value as discussed above. For example, if the first maximum number of RA preamble is one, this may be equivalent to above examples of Ns=1. When the network node 110 is triggered to change the restriction of maximum number of RA preambles for the network node 110 to concurrently handle, the network node 110 may then adjust the runtime parameter to be a second maximum number or RA preambles. When the first cell 110*c* has a low amount of traffic, there may be no need to select the second maximum number to be a high number, such as e.g. selected to be the maximum number of detections to be scheduled with RAR. This is since preamble transmissions are very sparse in time, and allowing more detections will increase a false detection risk, impact, and waste more RAR resources. However when the traffic is high, a higher second maximum number of RA preambles may be needed to secure RA capacity even if it may increase the risk of false detections. Hence, to address this, embodiments herein relate to deriving probabilities of how many number of preambles are probable to be transmitted in the first cell 110*c*. This may be derived e.g. from a probability of a preamble to be detected from a UE, e.g. the first UE 121, wherein the UE 121 is connected with the first cell 110*c*. Such probability is predictable based on network statistics such as e.g. CU per cell, average connection time, baseband processing load in the network node 110 etc. Using this information, it is possible to adjust the runtime parameter to restrict the network node 110 to handle at most a second maximum number of RA preambles in the first cell 110*c*.

A number of embodiments will now be described, some of which may be seen as alternatives, while some may be used in combination.

FIG. 4 shows example embodiments of a method performed by the network node 110 for controlling a maximum number of RA preambles for the network node 110 to handle concurrently in the first cell 110*c* in the wireless communications network 100. To control the maximum number of RA preambles means to make RA response to a limited number of UE at the same time so to avoid false detections and/or to save processing computation. A runtime parameter associated with the network node 110 restricts the network node 110 to handle at most a first maximum number of RA preambles concurrently. This means that the network node 110 is not allowed to handle more than the first maximum number of RA preambles concurrently.

The method comprises the following actions, which actions may be taken in any suitable order. Optional actions are referred to as dashed boxes in FIG. 4.

Action 401.

The network node 110 monitors load characteristics. The load characteristics are associated with the first cell 110*c*. Monitoring the load characteristics may involve measuring, receiving, obtaining and/or deriving the load characteristics according to any suitable method.

The load characteristics may be used for determining the activity of the first cell 110*c*. This may be to determine whether or not the cell activity has changed significantly, and if so, it may be a good time to restrict the network node 110 to a new maximum number of RA preambles to handle concurrently. Hence, any load characteristics, such as e.g. one or more parameters which relate to the activity of the first cell 110*c* may be used as load characteristics.

In some embodiments, the load characteristics comprises any one or more out of:

- The number of UEs connected with the network node 110 in an RRC connected state,
- a number of UEs within the coverage area of the first cell 110*c*,
- the average time for a UE connected with the network node 110 in an RRC connected state to remain in the RRC connected state,
- an inactivity timer indicating a time until an inactive UE will be released from an RRC connected state, and
- a number of time domain PRACH occasions within a PRACH slot.

All of the above parameters are related to the activity of UEs in the first cell 110*c*, and hence, if any of them changes significantly, this may indicate a change in cell activity of the first cell 110*c*. For example, if the number of UEs in proximity with the first cell 110*c* changes, connected or not, is likely to affect the activity of the first cell 110*c*. Similarly, if the inactivity timer or the above average time change, then a behavior of the UEs in the first cell 110*c* has changed, also indicating that the activity of the first cell 110*c* has changed.

Action 402.

The network node 110 selects a second maximum number of RA preambles to be handled concurrently by the network node 110. The network node 110 selects the second maximum number of RA preambles when the load characteristics fulfil a triggering condition. The second maximum number is for restricting the network node 110 to a new, i.e. another, more appropriate, maximum number of RA preambles to handle concurrently. Since it is selected based on the load characteristics fulfilling the triggering condition, restricting the network node 110 to handle at most the second maximum number of RA preambles concurrently is performed dynamically when the cell activity of the first cell 110*c* may have changed.

The second maximum number is selected such that a probability value fulfils a threshold. The probability value is associated with a probability that RA preambles that are to be concurrently transmitted in the first cell 110*c* will exceed the second maximum number of RA preambles. In other words, the probability value relates to how probable it is for the network node 110 to receive a number of concurrent RA preambles that would exceed the second maximum number of RA preambles. As a simple example, in some scenarios, the first cell 110*c* is connected with the first UE 121, the second UE 122, and the third UE 123. In this example, the second maximum number is selected to be two, and hence, the probability of exceeding the second maximum number of concurrent RA preambles would in this example be if all of the first, second, and third UEs 121, 122, 123 would perform RA concurrently. Since this case may be very rare, i.e. of very low probability, and since restricting the network node 110 to a low maximum number of concurrently handled RA preambles may reduce the number of false detections, it may be more efficient to allow for that the network node 110 cannot handle such a case since it is very rare and since false detections can instead be reduced if selecting the second maximum number of RA preambles to be two instead of three. To enable this type of dynamic trade-off between capacity and false detections, the second maximum number is selected such that the above probability value fulfils the above threshold. For example, this may be that the second maximum number is selected such that to allow for a small probability of the number of concurrent RA preambles will exceed the second maximum number. This may be of configurable probability depending on the need for capacity in relation to RA success rate, but generally set to be less than 0.1%. In other words, in some embodiments, the probability value may fulfil the threshold of being less than 0.1%, however, any other suitable mathematical approach for similar probability limitations of the concurrent RA preambles is also possible, i.e. by fulfilling some different threshold condition.

In some embodiments, the network node 110 selects the second maximum number of RA preambles to be handled concurrently by the network node 110, such that further, the second maximum number of RA preambles fulfils a processing capacity limit of the network node 110. In this way, it is further possible to ensure that the network node 110 can handle the second maximum number of RA preambles concurrently with regards to processing capacity, e.g. baseband processing capacity.

In some embodiments, the triggering condition relates to a change in at least a part of the load characteristics by more than a threshold. For example, the threshold if the load characteristics change by 5%, 10%, or any other suitable threshold, the second maximum number is to be selected.

Action 402*a*. In some embodiments, the network node 110 selects the second maximum number of RA preambles to be handled concurrently by the network node 110 by determining the probability value. The network node 110 may determine the probability value based on a number of UEs 121, 122, 123 connected with the network node 110 in a Radio Resource Control, RRC, connected state. The number of UEs may be a quantity of UEs connected with the network node 110 in the RRC connected state. In this way, knowing the number of UEs connected with the network node 110, it is possible to determine how probable it is for these UEs to perform RA towards the network node 110. This may e.g. be determined based on knowing how often, or how long time it takes for an average RRC connected UE to become inactive, i.e. to be released into an RRC inactive state, and then need to perform RA to regain the RRC connected state.

In some embodiments, the network node 110 determines the probability value further based on an estimated rate of RA preambles transmitted in the first cell 110*c*. In other words, when knowing how often RA preambles are to be transmitted in the first cell 110*c*, it is possible to determine the probability for how many RA preambles are to be transmitted in the first cell 110*c* concurrently. Using the rate, it may further be possible to determine the probability value based on the rate and how often PRACH occasions occur, e.g. when RA preambles is to be transmitted. When knowing the rate and how often PRACH occasions occur, it is thus possible to estimate an average value of the number of concurrent number of RA preambles transmitted in the first cell 110*c*. The probability of certain number of preambles to be transmitted in the first cell 110*c* may then be determined based on distributions over the average value. This may typically be performed by using ap Poisson distribution, e.g. using a Poisson Density Function (PDF), however, other distributions and statistical estimations may also be possible.

In some embodiments, the network node 110 determines the probability value further based on an average time for a UE out of the UEs 121, 122, 123 connected with the network node 110 in the RRC connected state to remain in the RRC connected state. For example, the average time may be used to estimate the above rate of preambles transmitted in the first cell 110*c*. This is since, when a UE is released from the RRC connected state, it is very likely to reconnect to the RRC connected state within a certain time frame.

In some embodiments, the network node 110 determines the probability value further based on an estimated time for a UE out of the UEs 121, 122, 123 connected with the network node 110 in the RRC connected state to reconnect to the first cell 110*c*. Similarly, the reconnection time may also be used to further estimate the rate of the preambles transmitted in the first cell 110*c*.

Action 403. The network node 110 then adjusts the runtime parameter to restrict the network node 110 to handle at most the second maximum number of RA preambles concurrently. In this way, the runtime parameter is adjusted in a dynamical way such that the network node 110 is restricted to handle the most probable numbers of RA preambles concurrently, while still avoiding false detections to the degree it is possible. The runtime parameter may e.g. restrict the number of preambles the network node 110 may respond to in each PRACH occasion.

In some embodiments regarding any one or more of the above actions 401-403, the number of UEs connected with the network node 110 in an RRC connected state is established based on a previous number of UEs connected with the network node 110 in an RRC connected state. For example, the number of UEs connected in an RRC connected state may have been measured one or more times previously, and hence it may be possible to determine this number based on statistical operations. Furthermore the number of UEs connected with the network node 110 in an RRC connected state may be determined based on an average and/or peak number of UEs connected with the network node 110 within a recent time period, e.g. a 15-minute interval.

Embodiments herein may be used for both Contention-based RA (CBRA) and Contention-free RA (CFRA). Since parameters may differ for CBRA and CFRA, the runtime parameter and methods may be shared for both, or may be performed separately for each of CBRA and CFRA.

The above embodiments will now be further explained and exemplified below. The embodiments below may be combined with any suitable embodiment above.

Characteristic of Random Access traffic. In the first cell 110*c*, an inactive UE such as e.g. the first UE 121, the second UE 122, and/or the third UE 123, will be released after a timer expires, e.g. an InactivityTimer. When the timer has expired, RA may be performed again when the inactive UE reconnects. This type of RA is together with handover, assumed to be the majority out of all random access attempts.

A rule of thumb for this to happen is that an average $T_{RRC}$ is approximately the Inactivity Timer+8 seconds. The 8 seconds may be used according to LTE experience, and this number may vary and could e.g. be different for NR. A further rule of thumb is for the rate of PRACH preamble transmissions in the first cell 110*c* to be:

$$f_{ra} \approx \frac{N_{CU}}{T_{RRC}}$$

where $T_{RRC} \approx T_{inact}+8$ as mentioned above, and $N_{CU}$ is the number of UEs in the state RRC connected. The number of PRACH preambles transmitted in the first cell 110*c* during a PRACH occasion may follow a Poisson distribution with average value:

$$\lambda = \frac{f_{ra}}{f_{occasion}}$$

where $f_{occasion}$ defines how often PRACH occasions occur, which determined by a PRACH configuration index, e.g. as described in 3GPP TS 38.211 v15.6.0, Physical channels and modulation. The probability of concurrent number of preamble transmissions in a cell during a PRACH occasion may then be obtained from a Poisson PDF such that:

$$p_{ra}(d=n) = \text{Pois\_PDF}(\lambda, n) = e^{-\lambda}\frac{\lambda^n}{n!},$$

e.g. which may be as explained in above action 402*a*.

When knowing the Poisson distribution, it may thus be possible to determine the probability that more than n preambles occur in one PRACH occasion can be derived from Poisson CDF (Cumulative Distribution Function) which is: $p_{ra}(d>n)=1-\text{Pois\_CDF}(\lambda, n)$. This may be how the probability value of above actions 402 and 402*a* is determined. For example, the n preambles may be the above second maximum number of RA preambles to be transmitted concurrently.

Figure 5:
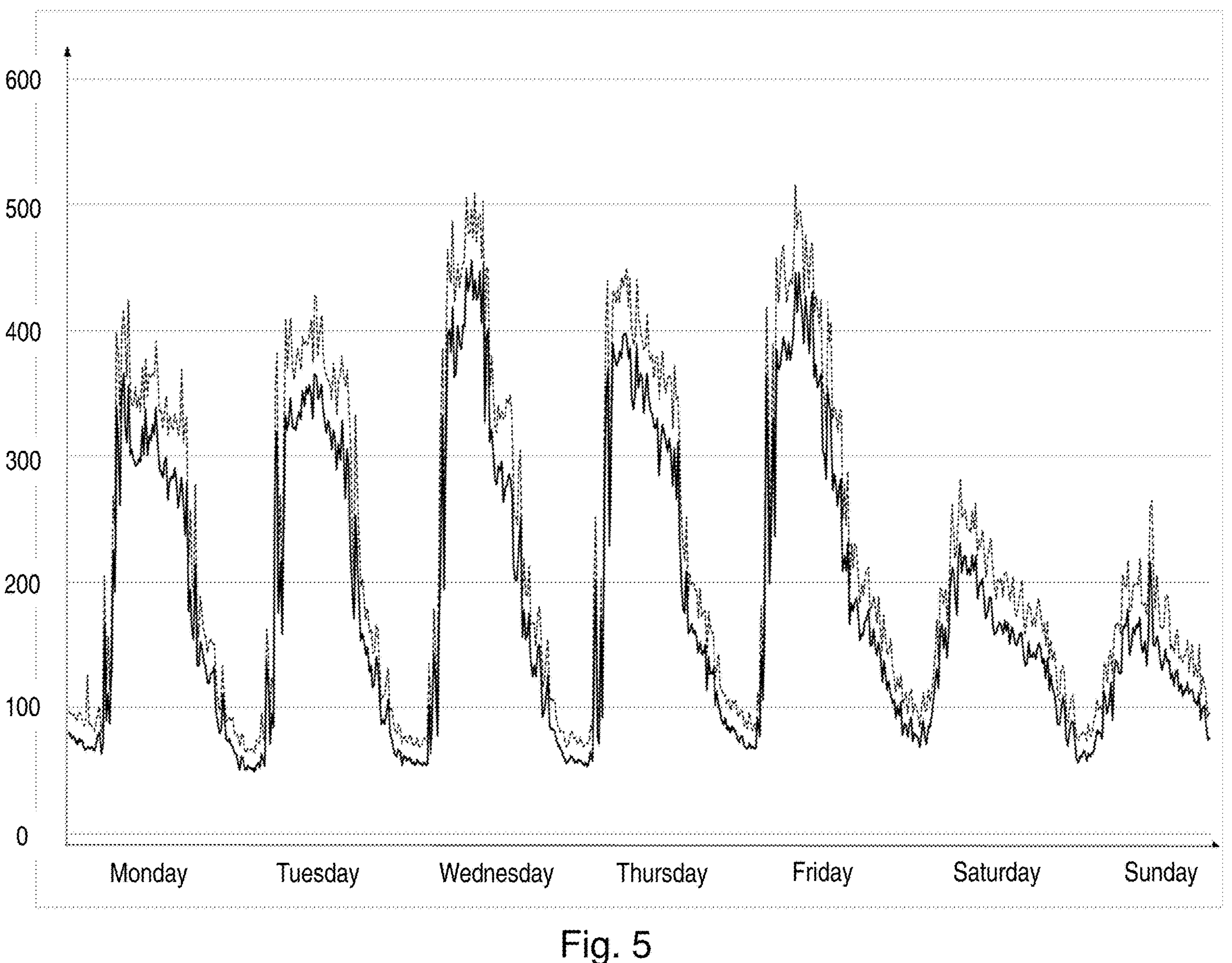
FIG. 5 is a schematic block diagram illustrating embodiments herein.

FIG. 5 illustrates a number of RRC connected UEs to the first cell 110*c* during 15 minute intervals. The solid line illustrates an average number of RRC connected UEs per 15 minutes. The dashed line illustrates the peak number of RRC connected UEs per 15 minutes. Since the number of UEs, i.e. $N_{CU}$, may vary a lot with time and day, as illustrated by FIG. 5, the above preamble density $p_{ra}(n)$ will change accordingly which means that sometimes, e.g. nights and/or weekends, capacity may be less demanded. Hence, a tradeoff between capacity and another performance aspect e.g. a lower level of false detections may be performed as the activity of the first cell 110*c* changes.

In some embodiments herein, the network node 110 may perform the following steps.

Step 1: Extract and/or calculate parameters including $N_{CU}$, $T_{RRC}$, $f_{occasion}$. These parameters may be the load characteristics above, e.g. related to action 401. $N_{CU}$, i.e. the number of connected UEs, may be extracted from a counter on a 15 min-basis. From FIG. 5, it can be seen that $N_{CU}$ max value is often only slightly higher than a 15 min average which means for 15 min-basis it may be good enough to use an average value if an error margin, e.g. 10%, is deemed acceptable. $T_{RRC}$ may be an empirical value directly configured. In other words, this may be the time for UEs to become inactive and then to reconnect to the first cell 110*c*. This value may e.g. be measured over several UEs by the network node 110*c*. For example, the value may be obtained by a count starting from an S1 setup until a context release per UE and get an average value. $f_{occasion}$ is normally defined by PRACH configuration index directly, e.g. as in chapter 6.3.3.2 of 3GPP TS 38.211 v15.6.0, "Physical channels and modulation".

If one or more of the extracted and/or calculated values has a significant change, e.g. by 5% or more, proceed to Step 2 otherwise keep monitoring the parameters in Step 1. Step 1 may be related to above action 401.

Step 2: Select an integer no so that it can fulfill the below Conditions A and B. The integer no may be the second maximum number of above actions 401-403. Step 2 may be related to above actions 402 and 402*a*.

Condition A: $p_{ra}(d>n_0)<p_0$, where $p_0$ is a predefined probability threshold, e.g. 0.1%, which is determined based on the cells' 110*c* and/or network/operator's tolerance of extra random access delay which would be incurred if the capacity is limited or if false detections are present. This threshold can be same or different for CBRA and CFRA, considering that CBRA and CFRA have different function in network signaling and operation, the tolerance may be different also. This may also be the threshold which the probability value of action 402 need to fulfil.

Condition B: $n_0<n_{max}$, where $n_{max}$ is according to a baseband processing capacity limit, which takes real-time baseband processing Central Processing Unit (CPU) load of the network node 110, or a maximum number of parallel RAR handling of the network node 110 into consideration.

Step 3: Set $Ns=n_0$, where Ns preambles is the maximum number of preambles that may be responded in each PRACH occasion. Return to Step 1. Step 3 may be related to above action 403.

Network node implementation. To perform the method actions above, the network node 110 is configured to control a maximum number of RA preambles for the network node 110 to handle concurrently in the first cell 110*c* in the wireless communications network 100. A runtime parameter associated with the network node 110 is adapted to restrict the network node 110 to handle at most a first maximum number of RA preambles concurrently. The network node 110 may comprise an arrangement depicted in FIGS. 6*a* and 6*b*.

The network node 110 may comprise an input and output interface 600 configured to communicate with e.g. the first, second, and/or third UE 121, 122, 123. The input and output interface 600 may comprise a wireless receiver (not shown) and a wireless transmitter (not shown).

The network node 110 may further be configured to, e.g. by means of a monitoring unit 610 in the network node 110, monitor load characteristics. The load characteristics are adapted to be associated with the first cell 110*c*.

The network node 110 may further be configured to, e.g. by means of a selecting unit 620 in the network node 110, when the load characteristics fulfil a triggering condition, select a second maximum number of RA preambles to be handled concurrently by the network node 110. The second maximum number is arranged to be selected such that a probability value fulfils a threshold. The probability value is adapted to be associated with a probability that RA preambles that are to be concurrently transmitted in the first cell 110*c* will exceed the second maximum number of RA preambles.

The network node 110 may further be configured to, e.g. by means of the selecting unit 620 in the network node 110, select the second maximum number of RA preambles to be handled concurrently by the network node 110 such that the second maximum number of RA preambles is further arranged to fulfil a processing capacity limit of the network node 110.

The network node 110 may further be configured to, e.g. by means of the selecting unit 620 in the network node 110, select the second maximum number of RA preambles to be handled concurrently by the network node 110 by:

determining, e.g. by means of a determining unit 640 in the network node 110, the probability value based on a number of UEs 121, 122, 123 connected with the network node 110 in a RRC connected state.

The network node 110 may further be configured to, e.g. by means of the selecting unit 620 in the network node 110, select the second maximum number of RA preambles to be handled concurrently by the network node 110 by:

determining, e.g. by means of the determining unit 640 in the network node 110, the probability value further based on an estimated rate of RA preambles transmitted in the first cell 110*c*.

The network node 110 may further be configured to, e.g. by means of the selecting unit 620 in the network node 110, select the second maximum number of RA preambles to be handled concurrently by the network node 110 by:

determining, e.g. by means of the determining unit 640 in the network node 110, the probability value further based on an average time for a UE out of the UEs 121, 122, 123 connected with the network node 110 in the RRC connected state to remain in the RRC connected state.

The network node 110 may further be configured to, e.g. by means of the selecting unit 620 in the network node 110, select the second maximum number of RA preambles to be handled concurrently by the network node 110 by:

determining, e.g. by means of the determining unit 640 in the network node 110, the probability value further based on an estimated time for a UE out of the UEs 121, 122, 123 connected with the network node 110 in the RRC connected state to reconnect to the first cell 110*c*.

The network node 110 may further be configured to, e.g. by means of an adjusting unit 630 in the network node 110, adjust the runtime parameter to restrict the network node 110 to handle at most the second maximum number of RA preambles concurrently.

In some embodiments, the triggering condition is arranged to be related to a change in at least a part of the load characteristics by more than a threshold.

In some embodiments, the load characteristics are adapted to comprise any one or more out of:

the number of UEs connected with the network node 110 in an RRC connected state, a number of UEs within the coverage area of the first cell 110*c,* the average time for a UE connected with the network node 110 in an RRC connected state to remain in the RRC connected state, an inactivity timer indicating a time until an inactive UE will be released from an RRC connected state, and a number of time domain PRACH occasions within a PRACH slot.

In some embodiments, the number of UEs connected with the network node 110 in an RRC connected state is adapted to be established based on a previous number of UEs connected with the network node 110 in an RRC connected state.

Figure 6A:
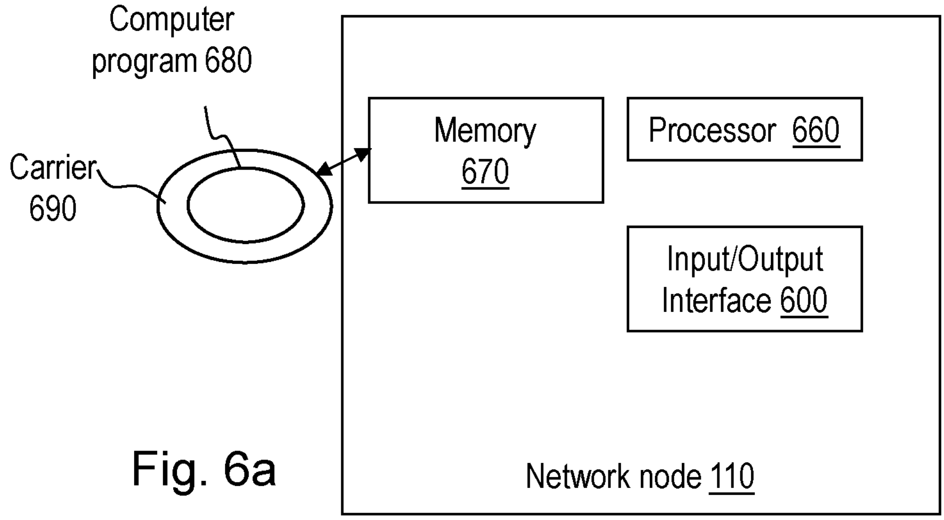
FIGS. 6*a-b* are schematic block diagrams illustrating embodiments of a network node.
Figure 6B:
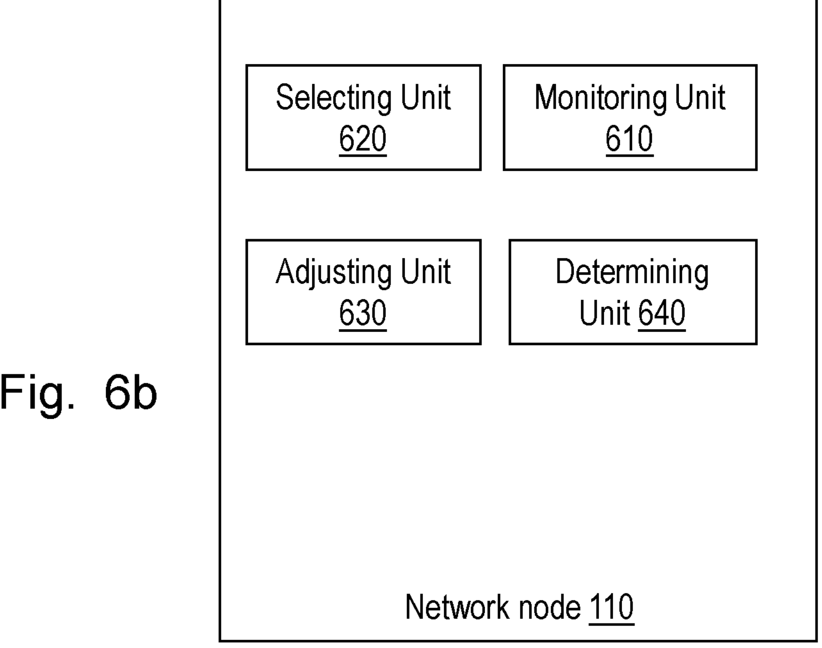

The embodiments herein may be implemented through a respective processor or one or more processors, such as the processor 660 of a processing circuitry in the network node 110 depicted in FIG. 6*a*, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 670 comprising one or more memory units. The memory 670 comprises instructions executable by the processor in network node 110. The memory 670 is arranged to be used to store e.g. information, data, configurations, thresholds, probabilities, maximum numbers, runtime parameters, and applications to perform the methods herein when being executed in the network node 110.

In some embodiments, a computer program 680 comprises instructions, which when executed by the respective at least one processor 660, cause the at least one processor of the network node 110 to perform the actions above.

In some embodiments, a respective carrier 690 comprises the respective computer program 680, wherein the carrier 690 is one of an electronic signal, an optical signal, an electromagnetic signal, a magnetic signal, an electric signal, a radio signal, a microwave signal, or a computer-readable storage medium.

Those skilled in the art will appreciate that the units in the network node 110 described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
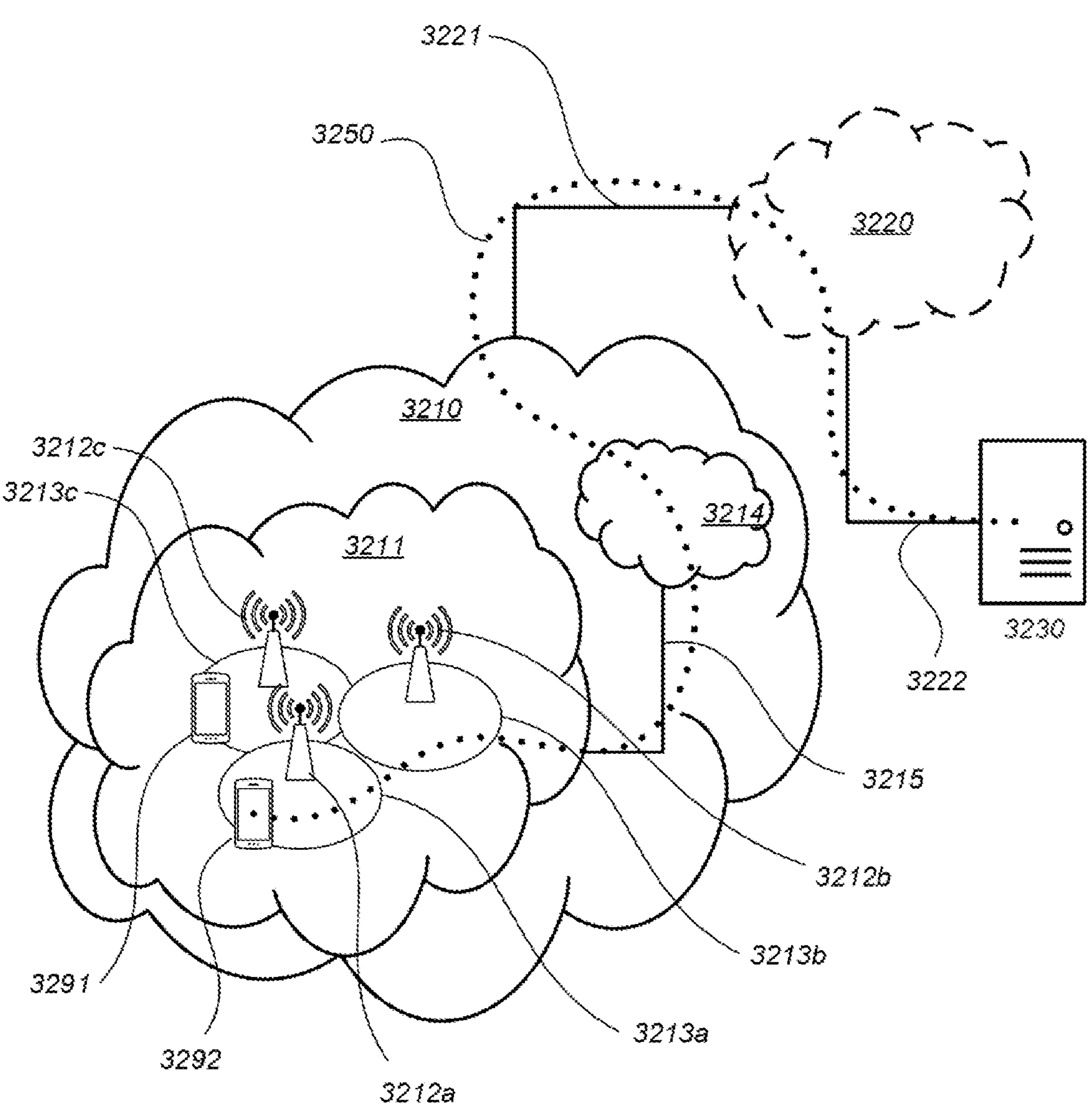
FIG. 7 schematically illustrates a telecommunications network connected via an intermediate network to a host computer.

With reference to FIG. 7, in accordance with an embodiment, a communication system includes a telecommunications network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the first UE 121 such as a Non-AP STA 3291 located in coverage area 3213*c* is configured to wirelessly connect to, or be paged by, the corresponding base station 3212*c*. A second UE 3292 e.g. the second UE 122, such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunications network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunications network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
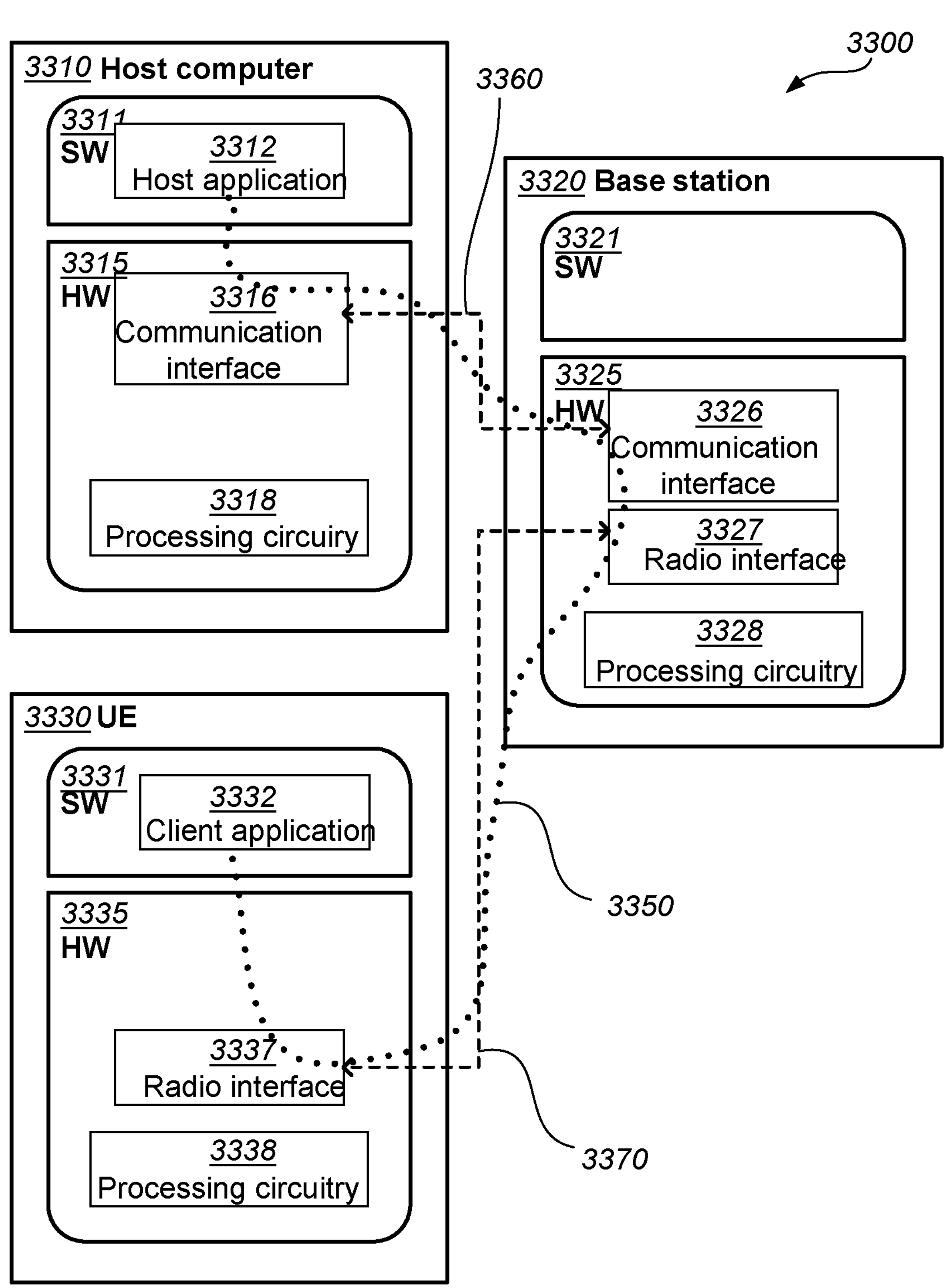
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations **3212*a*, 3212*b*, 3212*c* and one of the UEs 3291, 3292 of FIG. 7, respectively. This is to say, the inner workings of these entities may be as shown in FIG. 8 and independently, the surrounding network topology may be that of FIG. 7**.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, reduced interference, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 9, 10:
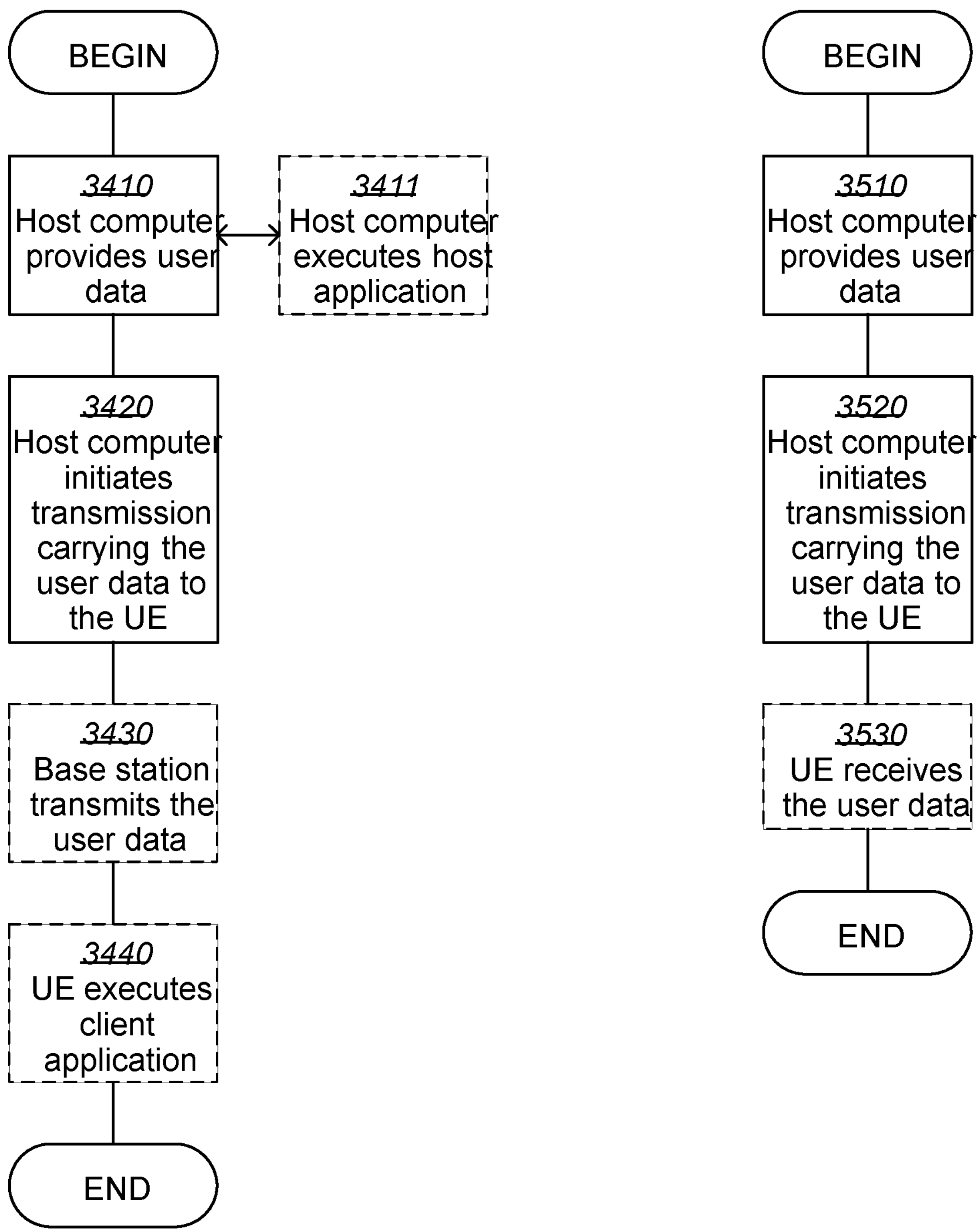
FIGS. 9-12 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station such as e.g. any of the network nodes in the first and/or second set of network nodes, and a UE such as e.g. the first UE 121 or the second UE 122, which may be those described with reference to FIG. 8 and FIG. 7. For simplicity of the present disclosure, only drawing references to FIG. 9 will be included in this section. In a first action 3410 of the method, the host computer provides user data. In an optional sub action 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 10 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 7. For simplicity of the present disclosure, only drawing references to FIG. 10 will be included in this section. In a first action 3510 of the method, the host computer provides user data. In an optional sub action (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 11, 12:
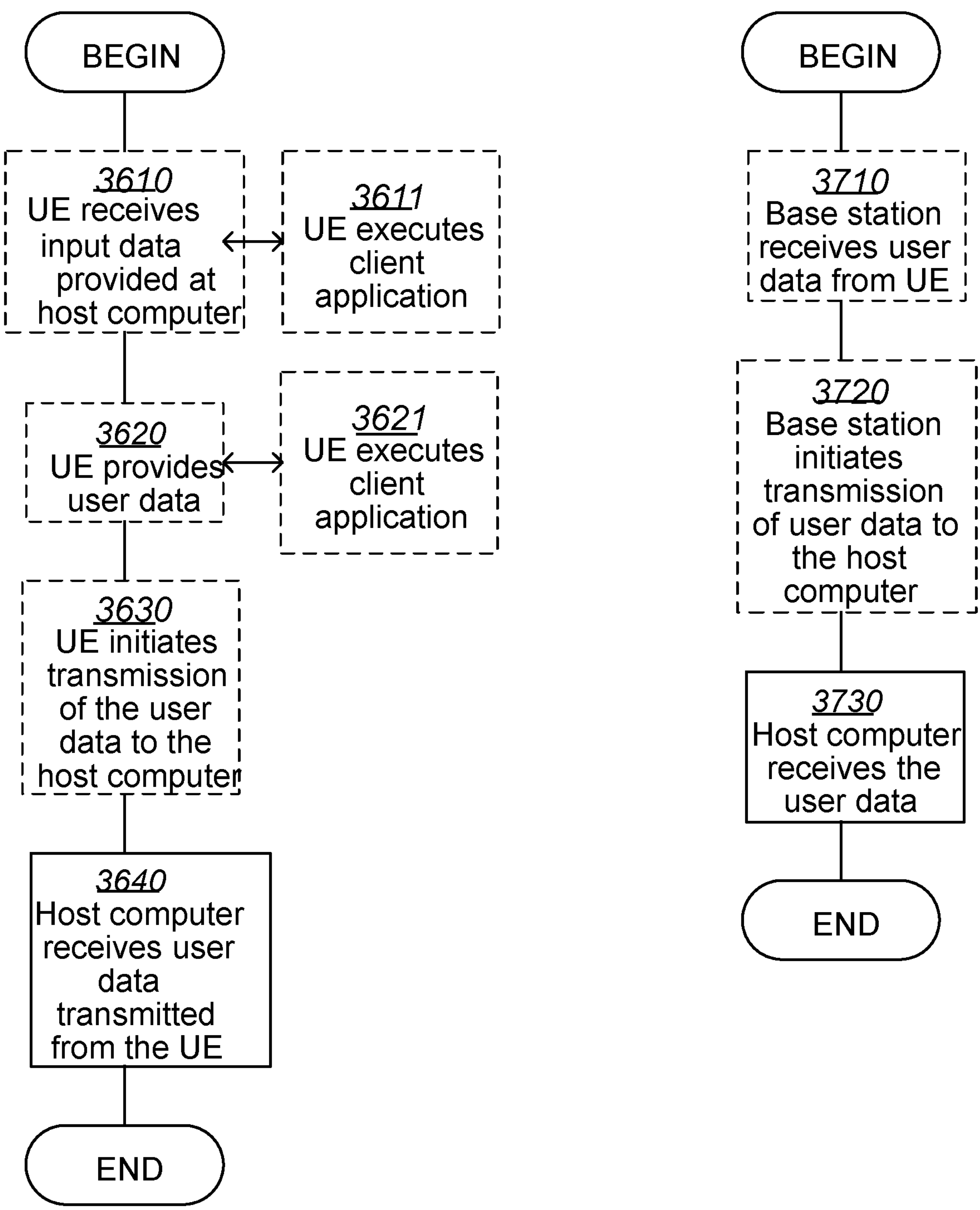

FIG. 11 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 7. For simplicity of the present disclosure, only drawing references to FIG. 11 will be included in this section. In an optional first action 3610 of the method, the UE receives input data provided by the host computer. Additionally or alternatively, in an optional second action 3620, the UE provides user data. In an optional sub action 3621 of the second action 3620, the UE provides the user data by executing a client application. In a further optional sub action 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub action 3630, transmission of the user data to the host computer. In a fourth action 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 7 For simplicity of the present disclosure, only drawing references to FIG. 12 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for controlling a maximum number of Random Access, RA, preambles for the network node to handle concurrently in a first cell in a wireless communications network, a runtime parameter associated with the network node restricting the network node to handle at most a first maximum number of RA preambles concurrently, the method comprising:

monitoring load characteristics, the load characteristics being associated with the first cell;

when the load characteristics fulfil a triggering condition, selecting a second maximum number of RA preambles to be handled concurrently by the network node, which second maximum number is selected such that a probability value fulfils a threshold, the probability value being associated with a probability that RA preambles that are to be concurrently transmitted in the first cell will exceed the second maximum number of RA preambles; and adjusting the runtime parameter to restrict the network node to handle at most the second maximum number of RA preambles concurrently.

2. The method according to claim 1, wherein selecting the second maximum number of RA preambles to be handled concurrently by the network node, is selected such that the second maximum number of RA preambles fulfils a processing capacity limit of the network node.

3. The method according to claim 2, wherein the triggering condition relates to a change in at least a part of the load characteristics by more than a threshold.

4. The method according to claim 1, wherein the triggering condition relates to a change in at least a part of the load characteristics by more than a threshold.

5. The method according to claim 1, wherein selecting the second maximum number of RA preambles to be handled concurrently by the network node, further comprises:

determining the probability value based on a number of UEs connected with the network node in a Radio Resource Control, RRC, connected state.

6. The method according to claim 5, wherein determining the probability value is further based on an estimated rate of RA preambles transmitted in the first cell.

7. The method according to claim 5, wherein determining the probability value is further based on an average time for a UE out of the UEs connected with the network node in the RRC connected state to remain in the RRC connected state.

8. The method according to claim 5, wherein determining the probability value is further based on an estimated time for a UE out of the UEs connected with the network node in the RRC connected state to reconnect to the first cell.

9. The method according to claim 5, wherein the number of UEs connected with the network node in an RRC connected state is established based on a previous number of UEs connected with the network node in an RRC connected state.

10. The method according to claim 1, wherein the load characteristics comprise any one or more of:

the number of UEs connected with the network node in an RRC connected state;

a number of UEs within the coverage area of the first cell;

the average time for a UE connected with the network node in an RRC connected state to remain in the RRC connected state;

an inactivity timer indicating a time until an inactive UE will be released from an RRC connected state; and a number of time domain PRACH occasions within a PRACH slot.

11. A network node configured to control a maximum number of Random Access, RA, preambles for the network node to handle concurrently in a first cell in a wireless communications network, a runtime parameter associated with the network node is adapted configured to restrict the network node to handle at most a first maximum number of RA preambles concurrently, the network node is being further configured to:

monitor load characteristics, wherein the load characteristics are adapted to be associated with the first cell;

when the load characteristics fulfil a triggering condition, select a second maximum number of RA preambles to be handled concurrently by the network node, which second maximum number is configured to be selected such that a probability value fulfils a threshold, the probability value being configured to be associated with a probability that RA preambles that are to be concurrently transmitted in the first cell will exceed the second maximum number of RA preambles; and adjust the runtime parameter to restrict the network node to handle at most the second maximum number of RA preambles concurrently.

12. The network node according to claim 11, wherein the network node is further configured to select the second maximum number of RA preambles to be handled concurrently by the network node such that the second maximum number of RA preambles is further configured to fulfil a processing capacity limit of the network node.

13. The network node according to claim 11, wherein the triggering condition is configured to be related to a change in at least a part of the load characteristics by more than a threshold.

14. The network node according to claim 11, wherein the network node is further configured to select the second maximum number of RA preambles to be handled concurrently by the network node by:

determining the probability value based on a number of UEs connected with the network node in a Radio Resource Control, RRC, connected state.

15. The network node according to claim 14, wherein the network node is further configured to select the second maximum number of RA preambles to be handled concurrently by the network node by:

determining the probability value further based on an estimated rate of RA preambles transmitted in the first cell.

16. The network node according to claim 14, wherein the network node is further configured to select the second maximum number of RA preambles to be handled concurrently by the network node by:

determining the probability value further based on an average time for a UE out of the UEs connected with the network node in the RRC connected state to remain in the RRC connected state.

17. The network node according to claim 14, wherein the network node is further configured to select the second maximum number of RA preambles to be handled concurrently by the network node by:

determining the probability value further based on an estimated time for a UE out of the UEs connected with the network node in the RRC connected state to reconnect to the first cell.

18. The network node according to claim 14, wherein the number of UEs connected with the network node in an RRC connected state is configured to be established based on a previous number of UEs connected with the network node in an RRC connected state.

19. The network node according to claim 11, wherein the load characteristics comprise any one or more out of:

the number of UEs connected with the network node in an RRC connected state;

a number of UEs within the coverage area of the first cell;

the average time for a UE connected with the network node in an RRC connected state to remain in the RRC connected state;

an inactivity timer indicating a time until an inactive UE will be released from an RRC connected state; and a number of time domain PRACH occasions within a PRACH slot.

20. A non-transitory computer storage medium storing a computer program comprising instructions, which when executed by a processor, cause the processor to control a maximum number of Random Access, RA, preambles for a network node to handle concurrently in a first cell in a wireless communications network, a runtime parameter associated with the network node restricting the network node to handle at most a first maximum number of RA preambles concurrently, by:

monitoring load characteristics, the load characteristics being associated with the first cell;

when the load characteristics fulfil a triggering condition, selecting a second maximum number of RA preambles to be handled concurrently by the network node, which second maximum number is selected such that a probability value fulfils a threshold, the probability value being associated with a probability that RA preambles that are to be concurrently transmitted in the first cell will exceed the second maximum number of RA preambles; and adjusting the runtime parameter to restrict the network node to handle at most the second maximum number of RA preambles concurrently.

* * * * *